(12) United States Patent
Corwin et al.

(10) Patent No.: US 9,581,800 B2
(45) Date of Patent: Feb. 28, 2017

(54) SLIDE HOLDER FOR DETECTION OF SLIDE PLACEMENT ON MICROSCOPE

(71) Applicant: GENERAL ELECTRIC COMPANY, Schenectady, NY (US)

(72) Inventors: Alex David Corwin, Niskayuna, NY (US); Kevin Bernard Kenny, Niskayuna, NY (US); Christine Lynne Pitner, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 14/550,187

(22) Filed: Nov. 21, 2014

(65) Prior Publication Data
US 2016/0147056 A1 May 26, 2016

(51) Int. Cl.
*G02B 21/34* (2006.01)
*B01L 9/00* (2006.01)
*G02B 27/32* (2006.01)

(52) U.S. Cl.
CPC .............. *G02B 21/34* (2013.01); *B01L 9/52* (2013.01); *G02B 27/32* (2013.01); *B01L 2200/025* (2013.01); *B01L 2300/0822* (2013.01)

(58) Field of Classification Search
CPC .................................................... G02B 21/34
USPC ......................................................... 359/391
See application file for complete search history.

(56) References Cited

U.S. PATENT DOCUMENTS 4,490,025 A * 12/1984 Weber .................... G02B 21/34
                                                             359/391
5,000,554 A    3/1991  Gibbs
5,659,421 A *  8/1997  Rahmel ................. G02B 21/26
                                                             359/391
5,694,212 A   12/1997  Weissman
5,781,337 A *  7/1998  Pfeifer .................. G02B 21/34
                                                             359/391
5,812,692 A    9/1998  Rosenlof et al.
6,118,582 A *  9/2000  Del Buono ......... B01L 3/50855
                                                             359/391
9,001,422 B2*  4/2015  Taylor .................... G02B 21/34
                                                             359/391

(Continued)

FOREIGN PATENT DOCUMENTS

WO       8908860 A1      9/1989
WO       0240977 A2      5/2002
WO    2014105747 A2      7/2014

OTHER PUBLICATIONS

Begelman et al., "Visual positioning of previously defined ROIs on microscopic slides", Information Technology in Biomedicine, IEEE Transactions, vol. 10, Issue 1, pp. 42-50, Jan. 2006.

(Continued)

*Primary Examiner* — Frank Font
(74) *Attorney, Agent, or Firm* — Melissa K. Dobson

(57) ABSTRACT

The invention provides a slide holder that utilizes edge detection algorithms to determine the location of various edges of a slide. From these edges, and integrating characteristic slide dimension, both linear offset of the edge of the slide in the holder and any rotation of the slide relative to the microscope stage axis are determined. The process of using the slide holder of the invention ensures precise and accurate placement of a slide during a first round of imaging and for reload in subsequent rounds.

12 Claims, 3 Drawing Sheets

(56) References Cited

U.S. PATENT DOCUMENTS

| | | | | |
|---|---|---|---|---|
| 9,013,569 B2* | 4/2015 | Hirono | ............... | G02B 21/26 348/79 |
| 2002/0079239 A1* | 6/2002 | Hrisinko | ............... | B01L 9/52 206/232 |
| 2002/0131167 A1* | 9/2002 | Nguyen | ............... | G02B 21/26 359/394 |
| 2003/0111373 A1* | 6/2003 | Chouinard | ............... | B65D 25/107 206/456 |
| 2004/0091395 A1* | 5/2004 | Ward | ............... | B01L 9/52 422/63 |
| 2004/0092024 A1* | 5/2004 | Reinhardt | ............... | B65H 1/08 436/43 |
| 2004/0130712 A1* | 7/2004 | Bosio | ............... | B01L 9/52 356/244 |
| 2005/0123181 A1 | 6/2005 | Freund et al. | | |
| 2006/0180489 A1* | 8/2006 | Guiney | ............... | B01L 9/52 206/456 |
| 2006/0198764 A1* | 9/2006 | Zimmermann | ............... | G02B 21/34 422/536 |
| 2006/0239868 A1* | 10/2006 | Sage | ............... | B01L 9/52 422/510 |
| 2008/0055572 A1 | 3/2008 | Scampini | | |
| 2011/0048142 A1* | 3/2011 | Pfeifer | ............... | G02B 21/34 73/864 |
| 2012/0075695 A1* | 3/2012 | DeBlasis | ............... | B01L 9/52 359/391 |
| 2012/0076391 A1 | 3/2012 | Deitz et al. | | |
| 2013/0201553 A1* | 8/2013 | James | ............... | B01L 9/52 359/398 |
| 2013/0222895 A1* | 8/2013 | Gelbart | ............... | G02B 21/365 359/363 |
| 2013/0259773 A1* | 10/2013 | Kubek | ............... | B01L 9/52 422/563 |
| 2013/0294826 A1* | 11/2013 | Chen | ............... | F16B 2/06 403/373 |
| 2014/0240824 A1* | 8/2014 | Taylor | ............... | G02B 21/34 359/391 |
| 2014/0268321 A1* | 9/2014 | Damiano, Jr. | ............... | G02B 21/26 359/391 |
| 2014/0329300 A1* | 11/2014 | Lundt | ............... | G01N 1/31 435/287.2 |
| 2014/0362436 A1* | 12/2014 | Forget | ............... | G01N 35/00029 359/391 |
| 2015/0226662 A1* | 8/2015 | Hirono | ............... | G02B 21/26 359/391 |

OTHER PUBLICATIONS

Kwon, "Accurate Slide Positioning using Fast Adaptive-Template Matching in an Automated Microscope", Instrumentation Science & Technology, vol. 42, Issue 4, pp. 385-401, May 9, 2014.
PCT/EP2015/0777193 Search Report, Mar. 17, 2016.

* cited by examiner

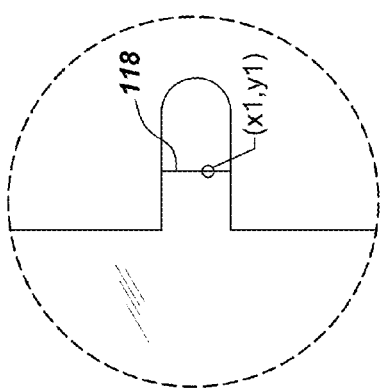
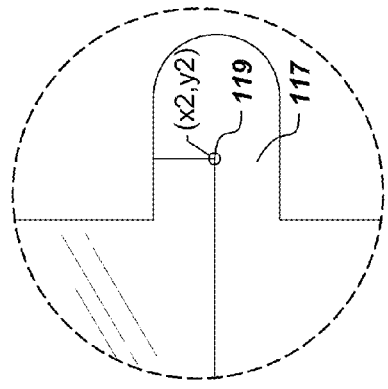
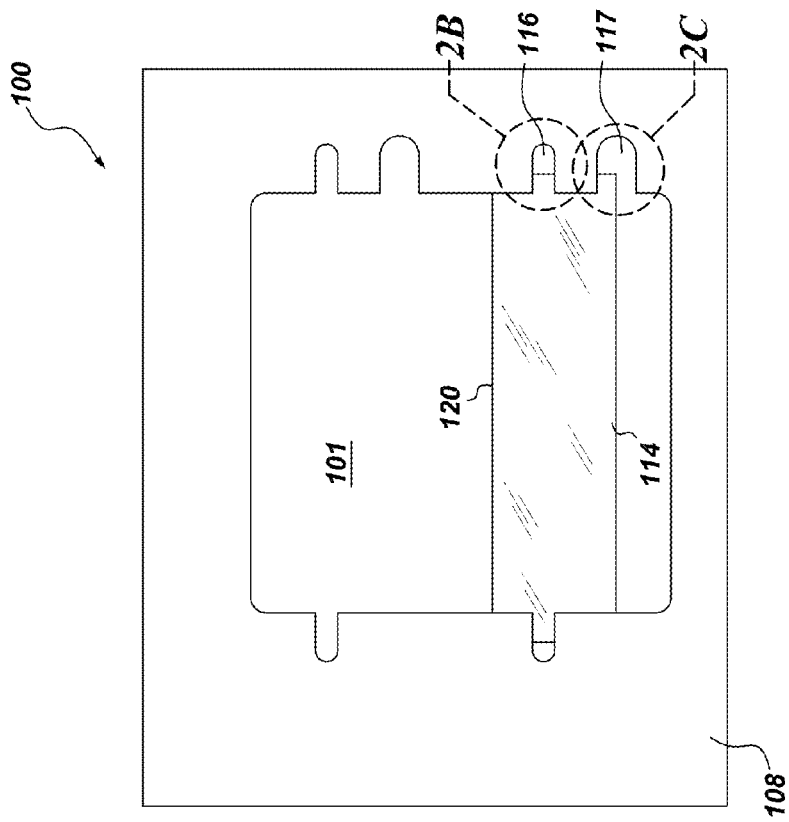

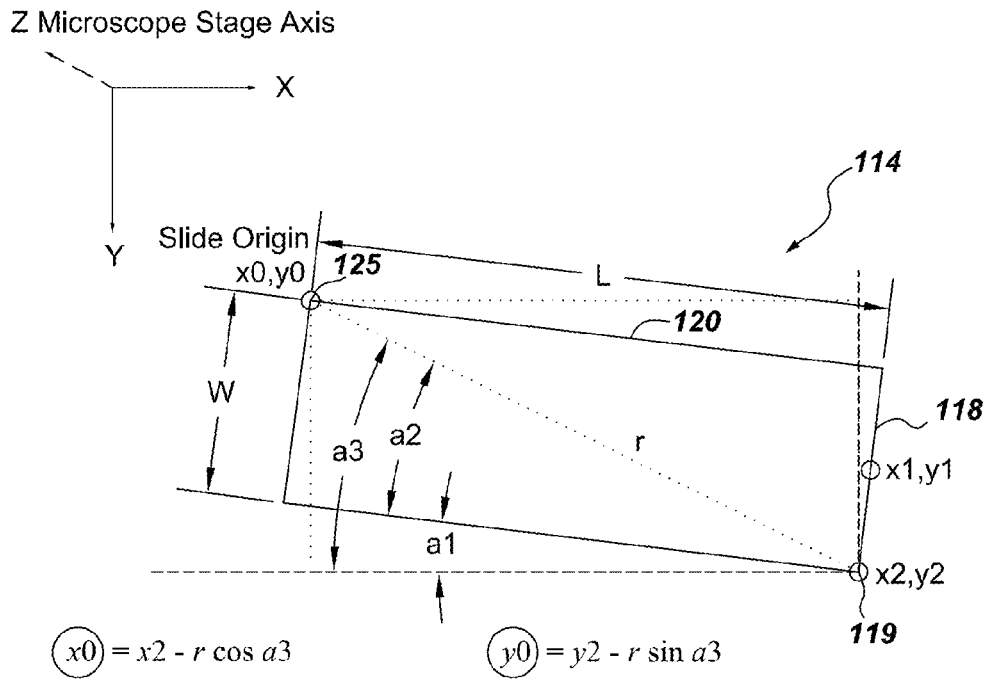
$$x0 = x2 - r \cos a3 \qquad y0 = y2 - r \sin a3$$
$$a1 = \tan^{-1}\left(\frac{x1-x2}{y1-y1}\right)$$
$$a2 = \tan^{-1}\left(\frac{W}{L}\right)$$
$$a3 = a1 + a2$$
$$r = \sqrt{W^2 + L^2}$$
Digital Verification 130
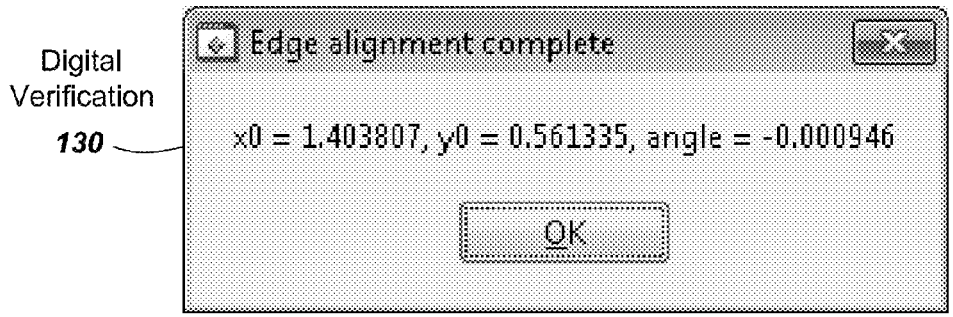
*Fig. 3*

SLIDE HOLDER FOR DETECTION OF SLIDE PLACEMENT ON MICROSCOPE

FIELD OF INVENTION

The subject matter disclosed herein relates to multiplexed applications, particularly in reference to slide placement on a microscope during optical imaging and of tissue samples or tissue microarrays (TMAs).

BACKGROUND

For various physiological conditions, such as cancer, infectious diseases, physiological disorders, and so forth, detection and monitoring may be based, in part, on the analysis of a biological specimen from the patient. For example, a sample may be analyzed to detect the presence of abnormal numbers or types of cells and/or organisms that may be indicative of a disease or disorder. Various types of microscopy may be employed for such analysis. Further, various stains and staining protocols may be employed as part of this analysis to allow visualization of different structures, chemicals, or environments that might aid in detection or diagnosis of a disease or disorder.

For diagnostics in cancer biology, multiplexed applications analyze tumor samples on a single cell level by studying the expression of more than 175 different proteins and disease markers per cell. Multiple stains can be added to a tumor slice; tumor antibodies directed to proteins of interest are measured and quantified by fluorescence. Because multiple stains and markers are measured in a single test, the amount of provided sample tissue need not be an issue. Using a single slide saves time, uses significantly less tissue, and provides a far more consistent result.

Every cell gets addressed on a digital map creating a graphic representation of protein expression in the tumor tissue. The data can be matched and compared with known protein expression profiles in other tumors to provide information on tumor characteristics and prognosis. Pathologists use software to identify expression patterns and perform cluster analysis on protein profiles to identify correlations and understand tumor behavior.

To facilitate analysis of such pathology or histology samples, automated microscopy systems have been developed that automate various aspects of the image acquisition process. In particular, digital optical microscopes may be used in such automated systems and provide a digital image output for each acquisition. Certain such systems employ scanning microscopes where a sequence of displaced images are acquired and associated together (e.g., "tiled" or "stitched" together) to form a composite of the sample region of interest. For example, in the context of pathology and histology imaging operations, tissue sample slides undergo imaging to acquire digital images of small adjacent or overlapping areas at high magnification and/or resolution. The adjacent or overlapping images may then be joined or associated to form a larger image that may be navigated on a digital display device. In this manner, a composite or mosaic image of the sample is generated, displayed, and navigated by a reviewer.

A complicating factor in the image generation and review process may be attributed to protocols where a sample undergoes multiple staining operations. In such instances, each staining step is associated with removing the slide from the microscope stage, treating the sample to remove any existing stain, applying the next stain, and replacing the slide on the microscope stage for imaging of the sample with the new stain. The act, however, of removing and replacing the slide on the microscope stage generally results in the slide being at a slightly different position for each round of imaging. As a result, corresponding images from each round of imaging may not be aligned. Further the composite images generated for each round of imaging may also be misaligned with respect to one another. As a result, analyses or comparisons conducted having images acquired using different stains are difficult or otherwise inhibited.

For the multiplexing ("MultiOmyx") process, it is critical that images taken from a single slide at different points in time all be registered to within a single pixel. As the slides may have physically left the microscope between these points, to allow for various operations such as staining and bleaching to take place, both mechanical alignment and software based image registration are necessary to align images of the slide. In loading the slide back in the microscope, the slide is inserted in a slide holder. Issues arise, however, when the slide is inserted incorrectly in the slide holder (i.e. rotated or offset). This can occur both because of user error and/or because of an accumulation of debris in either the holder or on the edge of the slide.

For imaging rounds other than the first round, an existing approach ensures that a slide is loaded into a holder and placed in a microscope well aligned with the slide position from the initial imaging round. This approach relies on comparing images of a reference channel (e.g. typically using DAPI (4',6' diamino-2-phenylindole.2HC1 staining) which stains the nucleus and does not change from round to round, e.g. between the current round and the initial round. By detecting changes in the image placements, a set of linear transformations are determined to relate the current slide position to the initial slide position. While this works well forsubsequent rounds, for the initial imaging round no other set of images are available for comparison; the initial imaging round is the baseline. This leaves the process susceptible to errors stemming from a misloaded slide in this initial imaging round. For example, operators change and multiple people are moving and replacing the slide during the process, such operators changing shifts in the clinical setting and attempting to keep the process as synchronous as possible.

Furthermore, techniques that currently exist to ensure subsequent imaging rounds proper align with respect to the first round are lacking. No methods to date have allowed for the detection of alignment failures in the first round. Later rounds depend upon this initial placement of a slide in the initial round. When errors do occur, later rounds can only be imaged if the slide is misloaded in the same way on later rounds as positioned on the first round. This proves very difficult as there are many ways to load a slide incorrectly as opposed to one way to have it loaded correctly.

For exemplary purposes, and not limitation, in studies of Hodgkin's Lymphoma in MultiOmyx directed tests in clinical settings, several tests have failed due to slide placement failure. These failures have included where slides have failed through the process after the second round of imaging 1% or less of cases) due to misalignment on the first round of imaging. In these cases, a second slide had to be utilized to be cut from a tissue block and sent through the MultiOmyx process since the failure could not be detected until the second round after which irreversible processing had already occurred on the slide. As MultiOmyx is positioned as a technology with advantages when tissue supply is limited, there is no opportunity to cut new slides when a first round alignment fails. Additionally, when tissue is available, running a second slide through the process adds both delays and cost to completion of the analysis. By detecting this misalignment during the initial imaging round, correction can be made by a manual repositioning of the slide or by folding in the alignment information and digitally correcting the proceeding acquisition for the observed alignment error.

Most previous attempts have involved trying to make a mechanically precise slide holder. Many alternative designs have been used, but are still susceptible to either gross human error or fowling of the slide itself. For example, even with a complicated mechanical mechanism to push a slide against a reference corner, if a barcode is misapplied to a slide and overhangs, the slide will still be pushed against a corner, though with the reference point including the barcode. When the barcode is replaced in later processing rounds (i.e. currently in the MultiOmyx process, barcodes are added and removed before staining) and when the slide is reloaded, it will sit at a different reference point (as the overhanging barcode will no longer be there). Additionally, for applications to date outside the field of MultiOmyx, it is not important that a slide be precisely repositioned in an imager for later imaging. Thus, in most cases it is ok if there is some discrepancy in slide alignment. Furthermore, work in detecting coverslip edges to limit imaging to under the coverslip does not address the above described issues either.

Thus, a need exists to have a technique to detect misloading of a slide in the initial imaging round. The technique will address appropriate loading of the slide by characterizing an angle and an offset of the slide, while further allowing comparison with a bounded value. The invention will address these needs in order to address optical quality and performance of the imaging technique, and comply with ongoing clinical processes.

BRIEF DESCRIPTION

The invention generally relates to a slide holder for detecting placement of a tissue-bearing slide on a microscope comprising: a horizontal base portion having a length, width, and height; at least two side wall portions that extend toward an opposite horizontal base portion, and together with the horizontal base form a peripheral three dimensional frame having a top planar surface and an underside planar surface, with an open imaging region formed therein; an etched groove in the top planar surface, the etched groove forming a secondary planar surface to position a slide within the peripheral three dimensional frame; one or more placement sliders secured by retractable adjustments to the peripheral three dimensional frame and adjacent a support to position a slide, wherein the retractable adjustments and the support secure the slide within bounds of the secondary planar surface of the peripheral three dimensional frame; and at least two notches configured with the secondary planar surface, a first notch to provide imaging visibility of a first location of a side edge of the slide and a second notch to provide imaging visibility of a second location at a corner of the slide when the slide holder is positioned upon an imaging microscope stage.

In one embodiment, the slide that is positioned within the slide holder is imaged from an underside by an inverted microscope. Aspects of the invention allow the first and second locations to determine orientation of the slide, including translational offset and angle of rotation of the slide. In one embodiment, the notches are open channels in the secondary planar surface. The open channels can have an imaging filter arranged thereon.

Embodiments of the invention provide a method of using a slide holder for detecting placement of a tissue-bearing slide on a microscope comprising: providing a slide holder as described above including at least two notches configured within the secondary planar surface, a first notch to provide imaging visibility of a first location of a side edge of the slide and a second notch to provide imaging visibility of a second location at a corner of the slide when the slide holder is positioned upon an imaging microscope stage; determining the first location of the side edge of the slide and determining the second location at the corner of the slide when the slide holder is positioned upon the imaging microscope stage; calculating angles of slide position using the first and second locations; and determining slide origin.

In one embodiment of the invention during the step of determining the first location and determining the second location, an initial image of the slide is provided in the first round such that the first notch and the second notch provide access to the side edge of the slide at the first location of (x1, y1) and to the corner of the slide at the second location of (x2, y2), respectively.

In various aspects of the invention, the first location of (x1, y1) and the second location of (x2, y2) are determined by correlating an image of the side edge of the slide and the corner of the slide, respectively, with a translated, rotated image of an ideal straight edge. As such, the correlation can be performed using one or more of a discrete Radon transformation, a Hough transformation, or a Fourier transformation in log-polar coordinates.

The method further details the step of calculating angles using dimensions including a slide length (L) and a slide width (W), as utilized in the following computations and performed by a computer processor to determine angles (a1, a2, a3) and calculate the hypotenuse of the slide, the angles defined by:

$$a1 = \tan^{-1}(x1-x2/y2-y1)$$

$$a2 = \tan^{-1}(W/L)$$

$$a3 = a1 + a2$$

$$r = \sqrt{W^2 + L^2}$$

In one embodiment, the step of determining slide origin at (x0, y0) is determined by placement of a horizontal edge of the slide characterized by: x0=x2−r cos a3; and placement of a top edge and bottom edge of the slide characterized by: y0=y2−r sin a3.

Further, the limits can be predetermined and set to automatically warn a user if the limits are exceeded. Such error notification or alignment confirmation is selected and implemented as desired by the user.

DRAWINGS

These and other features, aspects, and advantages of the present invention will become better understood when the following detailed description is read with reference to the accompanying drawings in which like characters represent like parts throughout the drawings, wherein:

FIG. 2A is an illustration of a perspective underside view of a slide holder in an embodiment of the invention, as visualized when the slide holder is positioned on the stage of the microscope and imaged from the underside.

FIG. 2B is a magnified view of a first notch in the slide holder within the grooved secondary planar surface with visibility of a side edge of the slide.

FIG. 2C is a magnified view of a second notch with visibility of a corner of the slide from an underside view of the slider holder.

FIG. 3 is an illustration of an embodiment of the invention to describe calculated positioning and location of a slide along the x and y axes of the slide holder in relation to the microscope stage axis z.

DETAILED DESCRIPTION

Figure 1:
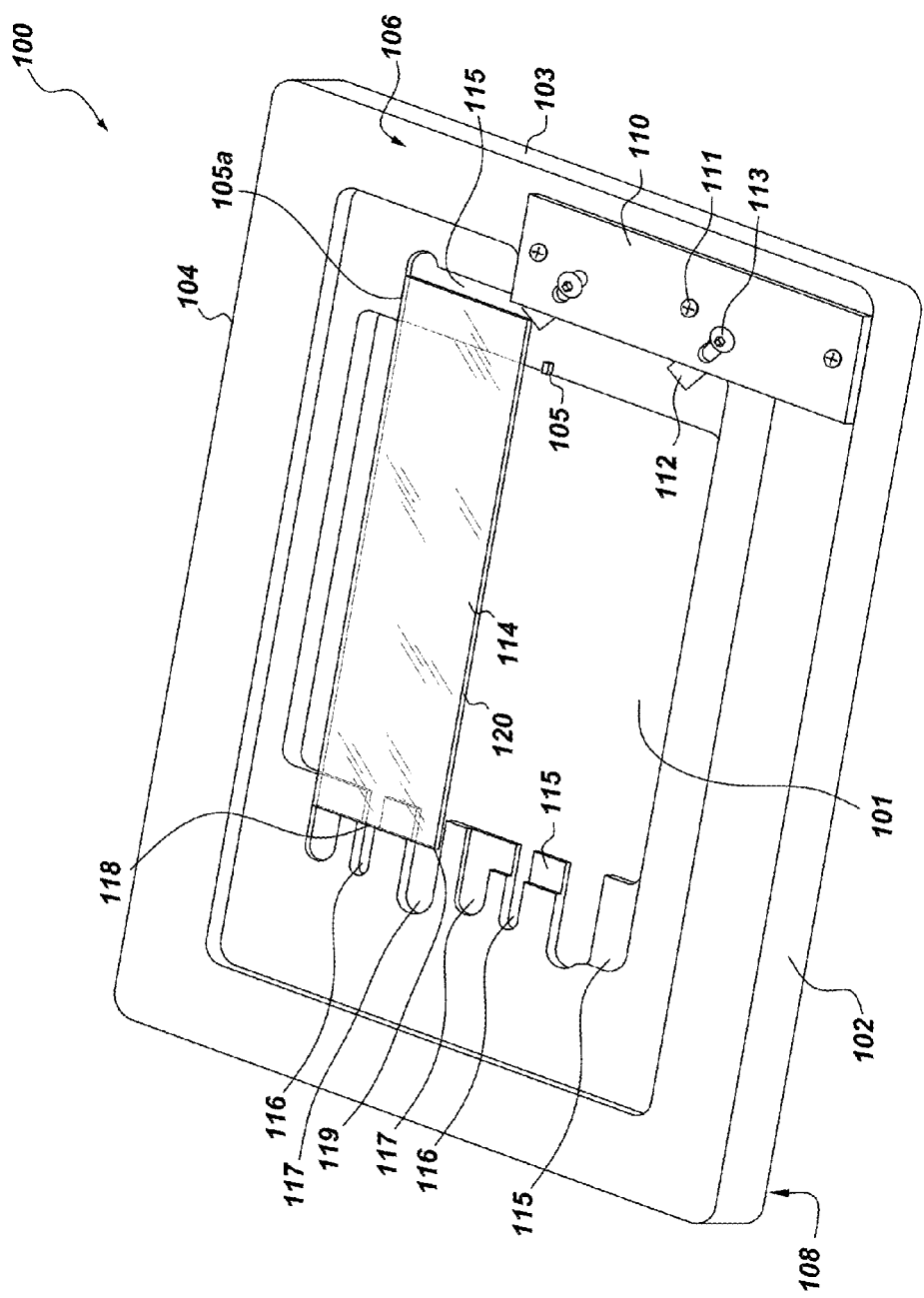
FIG. 1 is a perspective transparent view of an embodiment of a slide holder of the present invention.

To more clearly and concisely describe and point out the subject matter of the claimed invention, the following definitions are provide for specific terms, which are used in the following description and the appended claims.

The singular forms "a" "an" and "the" include plural referents unless the context clearly dictates otherwise. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. Unless otherwise indicated, numbers expressing quantities or properties such as angles, directions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, each numerical parameter should at least be construed in light of the number of reported significant digits and by applying ordinary rounding techniques.

In an embodiment of the invention, alignment of a slide on an imager ensures that a set of multi-round images, including the final captured set, are aligned via computation image registration. In order to make the slide edges available for imaging, a slide holder 100 has been modified in aspects of the invention to allow visual access to the edges. This is depicted as shown in FIG. 1.

As shown in FIG. 1, an embodiment of the slide holder 100 of the present invention is depicted in a perspective transparent view from a top side view of the slide holder. In one embodiment, as shown here, the slide holder is a two slide holder. In another aspect, the slide holder may have room for any number of slides and incorporate the features of the present invention. The slide holder 100 shown here comprises a horizontal base portion 102 and at two sides 103 extending toward an opposite horizontal base edge 104 to take the form a rectangular shaped device with an open imaging region 101 within a central region of the slide holder 100. The two sides 103 have a height, or thickness, that connects a top planar surface 106 of the slide holder and an underside planar surface 108. A cover plate 110 affixed by placement screws 111 holds placement sliders 112 that are secured by adjustments 113. The placement sliders 112 are retractable to allow a slide 114 to be positioned adjacent a supporting wall 105 and sit level on an etched groove 115 that creates visual access via notches 116 and 117 to a side edge 118 and a corner edge 119 of the slide. In addition, support 105a provides an adjacent physical stop that assists in positioning a second slide into an alternate second location of the slide holder.

Upon side edge 118, a designated a point (x1, y1) of the slide 114 is accessible and visible (see FIG. 2B) when the slide is positioned on the imaging microscope stage; notch 117 creates visual access to a corner 119 at a position (x2, y2) (see FIG. 2C). From an underside view (See FIG. 2A, 2B, 2C) of the slide holder, as visualized by the user and imager, the exposed features of the slide, respectively side edge 118 through notch 116, and corner 119 through notch 117, the slide location including offset and angle of rotation are determined In one aspect, the notches 116 and 117 are machined into the groove 115 of the slide holder as an integral component. The slide holder 100 is utilized in a first round alignment of a slide 114, as depicted in FIG. 1 to accurately place, position, and visualize the slide having the sample biological positioned thereupon. In one aspect, an error mode or digital verification 130 (e.g. here, shown as an alignment confirmation display) is designated when the slide is misaligned in the holder 100 during a first imaging round. Without the error mode, this could lead to failure of subsequent auto-alignments. By determining how the slide 114 sits in the holder 100 relative to the stage, alignment is more definite and accurate. As demonstrated in FIG. 1, visual access of the side edge 118, corner 119, and longitudinal edge 120 of the slide 114 is now possible. The edges and corner are chosen to avoid detection of false images from either a coverslip overhang or a barcode hanging off the edge of the slide, and to avoid misdetection as a slide edge. In one aspect of the invention, the edge 118 chosen is arranged such that if a coverslip is present, it will cause the slide to be tilted out of plane, and thus designate the error mode. Tilt detection methods, as known in the art, allow detection and notice of a misloaded slide. Furthermore, in the present use of the invention, the user is warned or alerted as to either misalignment or confirmation of alignment, respectively, before imaging occurs.

FIG. 2 illustrates a perspective underside view of the slide holder 100. As such, the underside planar surface 108 of the two slide holder has one slide 114 positioned within the top side 106 and sitting on a groove 115 (as shown in FIG. 1). Within that groove, notch 116 provides visual access to side edge 118 of the slide at position (x1, y1); and the notch 117 of the slide holder provides visual access to the corner 119 of the slide 114 at position (x2, y2).

By utilizing edge detection algorithms to determine the location of various edges of a slide, along with characteristics of slide dimension, both linear offset of the edge 118 of the slide 114 in the slide holder 100 and any rotation of the slide 114 relative to the microscope stage axis z can be determined. See FIG. 3. The ability to detect misalignment ensures that the final captured set of multi-round images are aligned via computational image registration. Embodiments of the invention allow subsequent imaging rounds to be properly aligned with respect to the first round, an aspect not previously possible.

Once the slide is in the slide holder and loaded onto the imager (not shown), the stage is moved to positions predetermined, as based on computerized commands and dependent upon machined features in the slide holder 100, to capture images of the various exposed features. The imaging is performed using a low magnification objective, though any magnification may be utilized, including higher magnifications. In one aspect, the slide is illuminated above to allow contrast of the bare glass, though other options for illumination may be utilized as well.

FIG. 3 is an illustration of an embodiment of the invention to describe calculated positioning and location of a slide 114 along the x and y axes of the slide holder in relation to the microscope stage axis z. Using an inverted microscope, and imaging from a bottom or under side of the slide, exposed features including side edge 118 and corner 119 of the slide are visualized through notches 116 and 117, respectively (as shown in FIGS. 2A, 2B, 2C). Coordinate positions are then determined within the x and y axes.

Specifically, once the images are captured, an edge finding routine allows both horizontal edge 120 and vertical edge 118 locations of the slide 114 to be located, here at designated (x1, y1) and (x2, y2), respectively. From these locations, (x1, y1) and (x2, y2), and knowing the slide geometry (e.g. length (L), width (W), and 90 degree angle of the slide), the origin 125 at (x0, y0) of the slide is determined along with an angle of rotation ("a1", "a2", "a3") with respect to the microscope stage. These calculations are described as follows with r equal to an intermediate value (e.g. hypotenuse, or longest linear segment across the slide) as determined by dimensions of the slide:

$$a1 = \tan^{-1}(x1-x2/y2-y1)$$

$$a2 = \tan^{-1}(W/L)$$

$$a3 = a1 + a2$$

$$r = \sqrt{W^2 + L^2}$$

In one embodiment, a Hough transform is utilized to find the edge of the slide. Various transforms may be utilized, however, as desired, to locate the edge. For exemplary purposes, and not limitation, one aspect of the invention looks for a specific edge (e.g. either vertical or horizontal) depending on what edge and corner are located.

With offset and rotation values, several options are then available. The simplest option is to have bound values set and warn the user when the values are exceeded. The bounds can be set with consideration as to how much mechanical misalignment is tolerated in later rounds, but still allow the image based alignment to work. For exemplary purposes, and not limitation, a determined amount or field of view is common between the initial imaging round and the current imaging round to determine correction.

Another option includes accounting for slide translation and rotation in the initial round; and off-setting both imaging locations as transform acquired images back to what would have been acquired if the slide had been loaded correctly. In this aspect, the approach is more robust and does not require a user to reload the slide.

A first step of the process includes determining the slide origin (x0, y0) and angles (a1, a2, a3) of slide position using positions of the slide at edge 118 and corner 119. Limits are predetermined and set to alert or warn a user if the defined limits are exceeded. As shown in FIG. 3, the placement of the horizontal edge 120 of the slide is characterized by:

$$x0 = x2 - r \cos a3$$

The top edge and bottom edge of the slide are characterized by:

$$y0 = y2 - r \sin a3$$

The angles (a1, a2, a3) of slide position are defined by:

$$a1 = \tan^{-1}(x1-x2/y2-y1)$$

$$a2 = \tan^{-1}(W/L)$$

$$a3 = a1 + a2$$

$$r = \sqrt{W^2 + L^2}$$

The slide having a length (L) and width (W) is then utilized to determine r, as characterized by the hypotenuse of the slide.

The invention is a method and apparatus to allow the alignment of a slide on an imager to be measured (due to either user error in loading the slide or in fouling of the holder or slide). Since inter-round registration enables the MultiOmyx processes, the ability to detect this misalignment ensures that subsequent and final captured sets of multi-round images are capable of being aligned via computation image registration. Thus, this improves techniques so that subsequent imaging rounds are properly aligned with respect to the first round, and further creates a method to detect alignment failures in the first round. This facilitates loading a slide correctly in each initial and subsequent placement of the slide on the slide holder.

Embodiments of the invention work by utilizing edge detection algorithms to determine the location of various edges of a slide. Aspects of the invention allow the slide edge in the image to be located by enhancing the image with techniques such as Roberts Corss, Sobel, or discrete Laplacian. Once an edge has been detected, the detection is refined by finding the closest fit straight line. Appropriate techniques for finding the line include, but are not limited to, the Hough transform, the discrete Radon transform, and the Fourier transform in log-polar coordinates. One embodiment uses the log-polar Fourier transformation to maximize the correlation between the image of the actual slide edge and a translated, rotated image of an ideal straight edge. Once this correlation is found, the point on the ideal edge that is nearest to the center of the camera is reported as the detected point. From these edges, and with knowledge of the characteristic slide dimensions, both the linear offset of the edge of the slide in the holder and any rotation of the slide relative to the microscope stage axis are determined.

Specifically, studies of Hodgkin's Lymphoma in MultiOmyx directed tests in clinical settings using the device and processes of the invention have improved accuracy and precision in slide placement. Due to improved placement in first round imaging, prior errors and failures have allowed slides to be processed at second and subsequent rounds of imaging. Thus, tissue use is minimized as a second slide does not need to be prepared from another cut of tissue and no further re-processing prevents time loss; this creates efficiency, including cost savings. By detecting misalignment during the initial imaging round, misalignment is corrected for either by a manual repositioning of the slide, or by folding in the alignment information and digitally correcting the proceeding acquisition for the observed alignment error. In other words, once the actual alignment is known for the first round, the slide can be either be reloaded to correct the misalignment, or instead, when aligning to slides on future rounds, digitally compensate for the observed misalignment of the first round to allow alignment with properly loaded slides on later rounds.

Yet, additional embodiments have the ability to digitally correct for the alignment error as work progresses on automation. In automated workflows, waiting for a human to reposition a slide keeps the slide from progressing through the workflow whereas being able to digitally correct will allow the slide to continue.

Embodiments of the device and processes of the invention provide a mechanically and digitally precise slide holder. The slide holder prevents human error and further optimizes automated imaging and processing. Further, the slide holder provides successful precise placement of a slide in the slide holder without interference of a barcode or coverslip. When the barcode is removed and replaced in later processing rounds (i.e. removed prior to staining in the MultiOmyx process), reloading of the slide is again precise and ensures that the slide sits at a common reference point within the slide holder. In one aspect, measuring and recording dimensions of the slide allows proper alignment and positioning of the slide to prevent subsequent error.

Embodiments of the invention allow for slides that have distinct features imprinted directly on the slide itself, or cross-hairs, as in the placement of the coverslip. In addition, image processing techniques can be utilized to calculate alignment of the slide by determining the location of these imprinted features. This, however, limits use to a specific slide type. On the other-hand, marking a slide with a feature before imaging and then using the feature to determine alignment may also be implemented with the device and processes of the invention herein described.

Further, other means may be utilized other than optical detection to find the edge of the slide such as use of a capacitive sensor or magnetic sensor. The sensor may be implemented on an edge, a surface, or integral with the composition of the slide. This technique integrates new components into a sensing station for greater precision and accuracy in alignment. For exemplary purposes, and not limitation, by positioning sensors at several locations near the edge of the slide, the edge position can be determined through the means described (i.e. capacitance, optical, or magnetic). Thus, by knowing the position of several locations on the edge of a slide, both translation and rotation of the slide can be calculated in the same manner. Greater accuracy is desired, however, and dependent upon the image acquisition method.

While only certain features of the invention have been illustrated and described herein, many modifications and changes will occur to those skilled in the art. For exemplary purposes, and not limitation, a slide holder as utilized in the art may be modified by cutting several notches into a planar surface so as to allow the edges of a placed slide to be detected there-through. Such modification would incorporate the edge finding methodology and utilize the algorithm of the present invention. As such, the sizes, shapes, and dimensions of the slide holder described herein may be modified and designed to be situated with any imaging apparatus. Illumination for a topside imager or bottomside imager may be implemented, and the same applies to the imaging apparatus that captures the images. Thus, it would be obvious to modify the design of the invention so that the top side and bottom side of the slide holder are reversible and/or symmetric for integration with any imager. It is, therefore, to be understood that the appended claims are intended to cover all such modifications and changes as fall within the true spirit of the invention.

The invention claimed is:

1. A slide holder for detecting placement of a slide on a microscope comprising:
   a horizontal base portion having a length, width, and height;
   at least two side wall portions that extend toward an opposite horizontal base portion, and together with the horizontal base form a peripheral three dimensional frame having a top planar surface and an underside planar surface, with an open imaging region formed therein;
   an etched groove in the top planar surface, the etched groove forming a secondary planar surface to position the slide within the peripheral three dimensional frame;
   one or more placement sliders secured by retractable adjustments to the peripheral three dimensional frame and adjacent a support to position the slide, wherein the retractable adjustments and the support secure the slide within bounds of the secondary planar surface of the peripheral three dimensional frame; and
   at least two notches configured with the secondary planar surface, a first notch to provide imaging visibility of a first location of a side edge of the slide and a second notch to provide imaging visibility of a second location at a corner of the slide when the slide holder is positioned upon an imaging microscope stage.

2. The slide holder of claim 1, wherein the slide is imaged from an underside by an inverted microscope.

3. The slide holder of claim 1, wherein the first and second locations determine orientation of the slide, including translational offset and angle of rotation of the slide.

4. The slide holder of claim 1, wherein the notches are open channels in the secondary planar surface.

5. The slide holder of claim 4, wherein the open channels have an imaging filter arranged thereon.

6. A method of using a slide holder for detecting placement of a slide on a microscope comprising:
   providing a slide holder including:
      a horizontal base portion having a length, width, and height;
      at least two side wall portions that extend toward an opposite horizontal base portion, and together with the horizontal base form a peripheral three dimensional frame having a top planar surface and an underside planar surface, with an open imaging region formed therein;
      an etched groove in the top planar surface, the etched groove forming a secondary planar surface to position the slide within the peripheral three dimensional frame;
      one or more placement sliders secured by retractable adjustments to the peripheral three dimensional frame and adjacent a support to position the slide, wherein the retractable adjustments and the support secure the slide within bounds of the secondary planar surface of the peripheral three dimensional frame; and
      at least two notches configured with the secondary planar surface, a first notch to provide imaging visibility of a first location of a side edge of the slide and a second notch to provide imaging visibility of a second location at a corner of the slide when the slide holder is positioned upon an imaging microscope stage;
   determining the first location of the side edge of the slide and determining the second location at the corner of the slide when the slide holder is positioned upon the imaging microscope stage;
   calculating angles of slide position using the first and second locations; and
   determining slide origin.

7. The method of claim 6, wherein the step of determining the first location and determining the second location includes providing an initial image of the slide in the first round such that the first notch and the second notch provide access to the side edge of the slide at the first location and to the corner of the slide at the second location, respectively.

8. The method of claim 7, wherein the first location and the second location are determined by correlating an image of the side edge of the slide and the corner of the slide, respectively, with a translated, rotated image of an ideal straight edge.

9. The method of claim 8, wherein the first location and the second location are determined using one or more of a discrete Radon transformation, a Hough transformation, or a Fourier transformation in log-polar coordinates.

10. The method of claim 6, wherein the step of calculating angles, dimensions including a slide length L and a slide width W are utilized in the following computations as performed by a computer processor to determine angles a1, a2, a3 and calculate the hypotenuse of the slide, the angles defined by:

$$a1 = \tan^{-1}(x1-x2/y2-y1)$$

$$a2 = \tan^{-1}(W/L)$$

$$a3 = a1 + a2$$

$$r = \sqrt{W^2 + L^2},$$

where r is a hypotenuse of the slide.

11. The method of claim 10, wherein the step of determining slide origin is determined by placement of a horizontal edge of the slide using r cos a3;

and placement of a top edge and a bottom edge of the slide using r sin a3.

12. The method of claim 6, wherein limits are predetermined and set to automatically warn a user if the limits are exceeded.

* * * * *